(12) United States Patent
Rhein et al.

(10) Patent No.: US 8,230,973 B2
(45) Date of Patent: Jul. 31, 2012

(54) TRANSMISSION PUMP SYSTEM

(75) Inventors: Robert E. Rhein, Clarkston, MI (US);
Todd A. Frerichs, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 737 days.

(21) Appl. No.: 12/274,170

(22) Filed: Nov. 19, 2008

(65) Prior Publication Data

US 2009/0139800 A1   Jun. 4, 2009

Related U.S. Application Data

(60) Provisional application No. 60/991,047, filed on Nov. 29, 2007.

(51) Int. Cl.
*F16H 57/04* (2010.01)
(52) U.S. Cl. .......................................... 184/6; 184/6.12
(58) Field of Classification Search ... 184/6; 123/196 R
See application file for complete search history.

(56) References Cited

U.S. PATENT DOCUMENTS

| 4,191,356 | A | * | 3/1980 | Ashmun et al. | 248/678 |
| 4,424,665 | A | * | 1/1984 | Guest et al. | 60/779 |
| 4,531,485 | A | * | 7/1985 | Murther | 123/196 S |
| 5,199,528 | A | * | 4/1993 | Rinaldo | 184/6.4 |
| 5,501,190 | A | * | 3/1996 | Okubo et al. | 123/196 M |
| 5,682,851 | A | * | 11/1997 | Breen et al. | 123/196 A |
| 6,089,841 | A | * | 7/2000 | Meernik et al. | 418/170 |
| 6,941,922 | B2 | * | 9/2005 | Williams et al. | 123/196 R |
| 2006/0231057 | A1 | * | 10/2006 | Futamura et al. | 123/196 R |

FOREIGN PATENT DOCUMENTS

| DE | 10147123 A1 | 4/2002 |
| DE | 102005013137 A1 | 9/2006 |

* cited by examiner

*Primary Examiner* — William E Dondero
*Assistant Examiner* — Michael Riegelman

(57) ABSTRACT

A pump system for use in a transmission includes a first pump, a second pump, and a sump. A first fluid passage connects an inlet of the first pump to a sump filter connected to the sump. A second fluid passage connects an inlet of the second pump to the sump filter of the sump. A third fluid passage connects the inlet of the first pump with the inlet of the second pump. A bypass outlet is in communication with the third fluid passage.

19 Claims, 1 Drawing Sheet

TRANSMISSION PUMP SYSTEM

CROSS-REFERENCE TO RELATED APPLICATIONS

This application claims the benefit of U.S. Provisional Application No. 60/991,047, filed on Nov. 29, 2007, which is hereby incorporated in its entirety herein by reference.

FIELD

The invention relates generally to a pump system in a transmission, and more particularly to a pump system in a transmission having a multiple function bypass circuit connecting a main pump and an auxiliary pump.

BACKGROUND

The statements in this section merely provide background information related to the present disclosure and may or may not constitute prior art.

A conventional transmission includes a pump assembly operable to circulate a hydraulic fluid, such as an oil, throughout the transmission to provide lubrication and/or cooling to the various components within the transmission. An exemplary pump assembly found in hybrid engine motor vehicles includes a primary pump, typically driven by the hybrid engine, and an auxiliary pump, typically driven by an electric motor. The main pump and auxiliary pump are in communication with a hydraulic fluid reservoir or sump. During operation, one of the pumps is activated while the other pump remains inactive or stationary. For example, when the main pump is active the auxiliary pump is stationary and hydraulic fluid is drawn from the sump through a main pump sump filter to the main pump where the hydraulic fluid is then delivered throughout the transmission. Excess hydraulic fluid not needed by the transmission is returned to the main pump via a main pump bypass circuit. When the auxiliary pump is activated the main pump may be stationary. When the main pump is stationary, hydraulic fluid is drawn from the sump through an auxiliary pump sump filter to the auxiliary pump where the hydraulic fluid is then delivered throughout the transmission. The small amount of excess hydraulic fluid not needed by the transmission is returned to the sump via the main pump bypass circuit. Typically, the main pump bypass circuit is not directly connected to the auxiliary feed circuit that connects the auxiliary pump to the sump.

During cold conditions, such as below 0 degrees Celsius, the hydraulic fluid from the main pump bypass circuit can damage the main pump sump filter if the main pump is stationary. This occurs as the hydraulic fluid forced by the running auxiliary pump enters the main pump bypass circuit and pressurizes the filter when the main pump is stationary. Additionally, when either the main pump or auxiliary pump are stationary, air can become entrapped within the main feed circuit and the auxiliary feed circuit near the inlet ports of the main pump and the auxiliary pump. Trapped air can create air lock where the pump is unable to provide the amount of hydraulic fluid flow required by the demands of the transmission. Accordingly, there is a need in the art for a pump system in a transmission that is usable in cold conditions, which is compact in size, and which reduces trapped air within the pumps.

SUMMARY

In an aspect of the present invention, a pump system for use in a transmission is provided. The pump system includes a first pump, a second pump, and a sump. A first fluid passage connects an inlet of the first pump to the sump. A second fluid passage is in fluid communication with an outlet of the first pump and a plurality of transmission components. A third fluid passage connects an inlet of the second pump with the sump. A fourth fluid passage is in fluid communication with an outlet port of the second pump and the plurality of transmission components. A fifth fluid passage has ends that are in fluid communication with the first and second pump inlets or the first and third fluid passages. A bypass passage is in fluid communication with the plurality of transmission components and the fifth fluid passage.

In another aspect of the present invention, a first end of the fifth fluid passage is connected to the inlet port of the first pump and a second end of the fifth fluid passage is connected to the inlet port of the second pump.

In yet another aspect of the present invention, a first end of the fifth fluid passage is connected to the first fluid passage proximate to the inlet port of the first pump and a second end of the fifth fluid passage is connected to the third fluid passage proximate to the inlet port of the second pump.

In still another aspect of the present invention there is a seventh fluid passage. A first end of the seventh fluid passage is in fluid communication with a top portion of the fluid inlet port of the first pump. A second end of the seventh passage is in fluid communication with the first end of the fifth passage.

In yet another aspect of the present invention, the fifth fluid passage connects to the inlet port of the first pump at a predefined angle relative to the first fluid passage. The fifth fluid passage connects to the inlet port of the second pump at a predetermined angle relative to the third fluid passage. This aspect of the present invention contemplates any predetermined angle, but angles between and including 0 degrees and 45 degrees are preferred.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
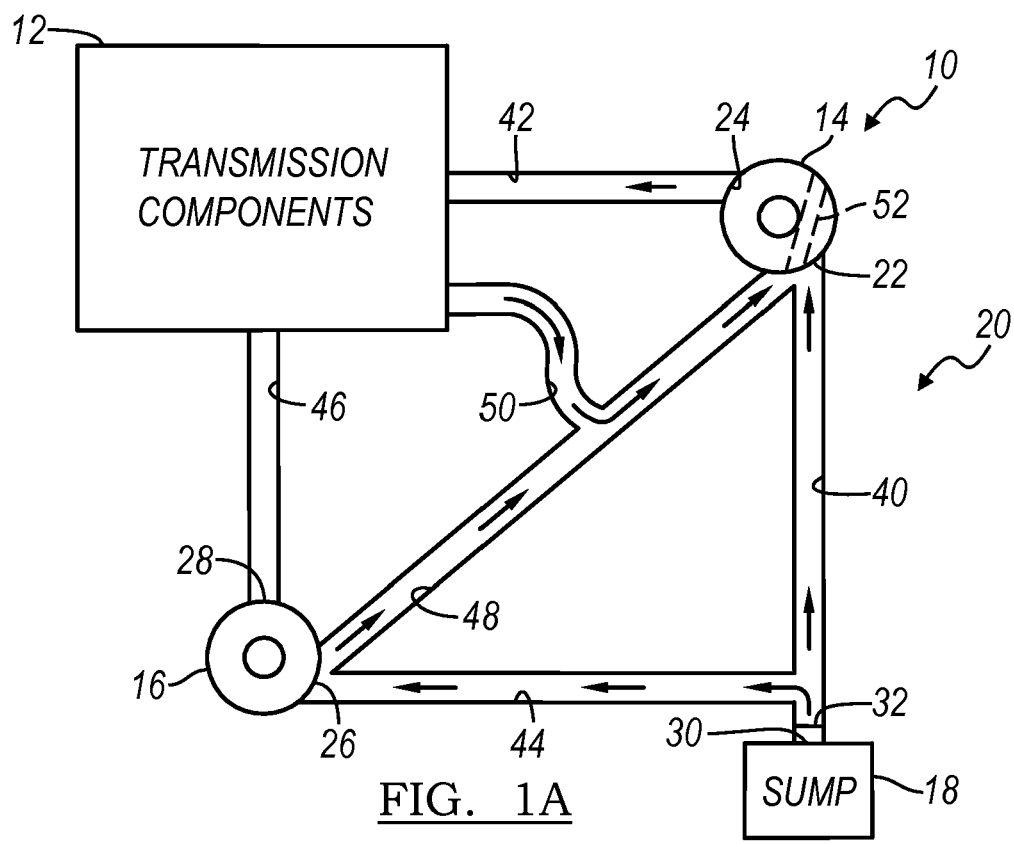
FIG. 1A is a diagrammatic view of an embodiment of a pump system according to the principles of the present invention during operation of a main pump.
Figure 1B:
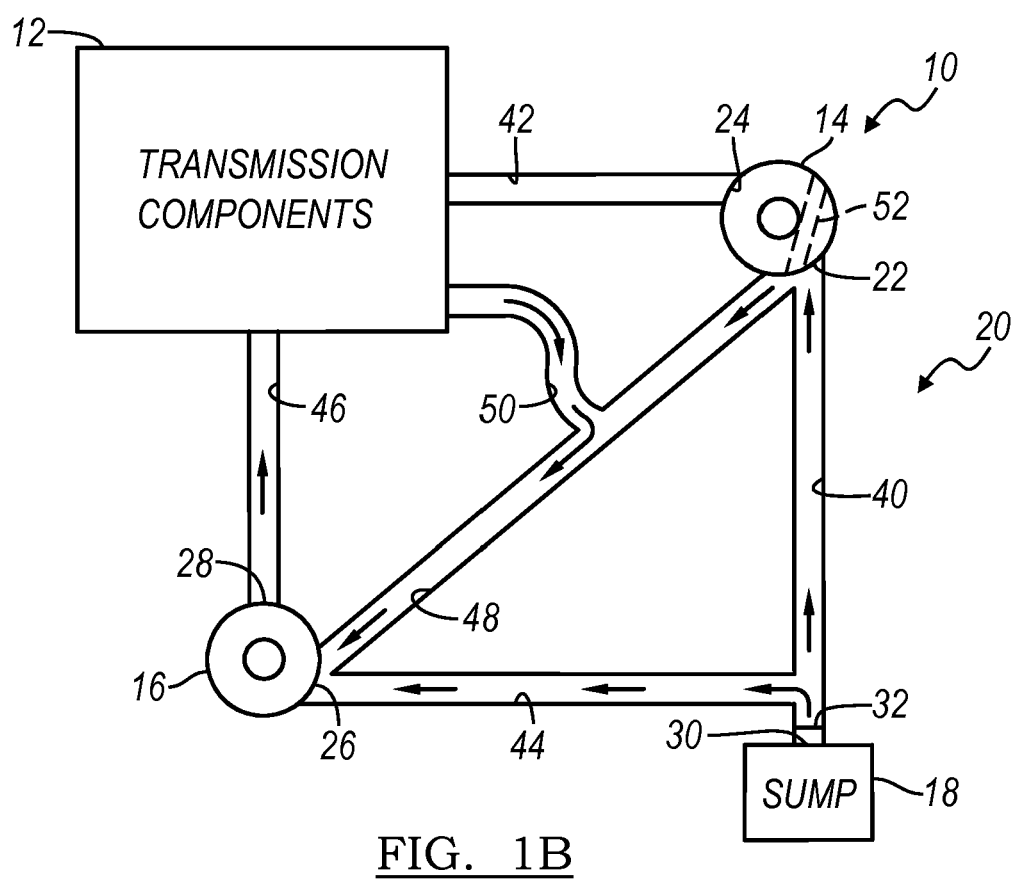
FIG. 1B is a diagrammatic view of an embodiment of a pump system according to the principles of the present invention during operation of an auxiliary pump.

With reference to FIGS. 1A and 1B, a pump system for use in an exemplary transmission in a motor vehicle is generally indicated by reference number 10. The pump system 10 is employed to provide a hydraulic fluid, such as oil, to a plurality of transmission systems or components 12. The transmission components 12 may include various devices or parts that may require fluid flow for hydraulic control functions, lubrication, or cooling, such as, for example, rotatable shafts, gearing arrangements, and/or torque transmitting devices.

The pump system 10 includes a first or main pump 14, a second or auxiliary pump 16, a fluid reservoir or sump 18, and a fluid circuit 20. The main pump 14 generally includes an inlet port 22 and an outlet port 24. In the present embodiment, the main pump 14 is preferably a crescent pump, however the main pump 14 may take many forms, such as, for example, an impeller pump, gear pump, or vane pump, without departing from the scope of the present invention. The main pump 14 is preferably air-tight through the use of sealing o-rings, shaft seals, as well as pressurizing the center and/or outlet port 24 with an orificed feed from a pressurized circuit (not shown). Additionally, in the present embodiment the main pump 14 is driven by an engine (not shown) in the motor vehicle and is preferably operable to provide approximately 15 liters per minute of fluid pumping capacity.

The auxiliary pump 16 generally includes an inlet port 26 and an outlet port 28. In the embodiment provided, the auxiliary pump 16 is preferably a gerotor pump, however the auxiliary pump 16 may take many forms, such as, for example, a crescent pump, an impeller pump, gear pump, or vane pump, without departing from the scope of the present invention. The auxiliary pump 16 is preferably air-tight through the use of sealing o-rings, shaft seals, as well as pressurizing the center and/or outlet port 28 with an orificed feed from a pressurized circuit (not shown). Additionally, in the present embodiment the auxiliary pump 16 is driven by an electric motor (not shown) in the motor vehicle and is preferably operable to provide approximately 15 liters per minute of fluid pumping capacity.

The sump 18 is a tank for storing a fluid, such as oil. The sump 18 includes a sump port 30 in communication with a sump filter 32. The sump filter 32 is operable to remove particulates from fluid flow entering or exiting the sump 18.

The fluid circuit 20 includes a plurality of fluid passages or channels either milled or formed in a housing of the transmission or defined by pipes or tubing. More specifically, the fluid circuit 20 includes at least a first fluid communication passage 40, a second fluid communication passage 42, a third fluid communication passage 44, a fourth fluid communication passage 46, a fifth fluid communication passage 48, and a sixth or bypass passage 50. The first fluid communication passage 40 communicates with the sump filter 32 and the inlet port 22 of the main pump 14. The second fluid communication passage 42 communicates with the outlet port 24 of the main pump 14 and the plurality of transmission components 12. The third fluid communication passage 44 communicates with the sump filter 32 and the inlet port 26 of the auxiliary pump 16. The fourth fluid communication passage 46 communicates with the outlet port 28 of the auxiliary pump 16 and the transmission components 12. The fifth fluid communication passage 48 communicates with the inlet port 22 of the main pump 14 and the inlet port 26 of the auxiliary pump 16. Alternatively, the fifth fluid communication passage 48 may communicate with the first fluid communication passage 40 near the inlet port 22 and/or with the third fluid communication passage 44 near the inlet port 26. The fifth fluid communication passage 48 is aligned so that the energy of hydraulic fluid flow through the fifth fluid communication passage 48 is conserved as it flows towards the pumps 14, 16 to aid in supercharging the activated pump, as will be described in greater detail below. Finally, the bypass passage 50 communicates with the plurality of transmission components 12 and the fifth fluid communication passage 48.

FIG. 1A illustrates the flow of hydraulic fluid (indicated by the plurality of arrows) through the pump system 10 when the main pump 14 is activated and the auxiliary pump 16 is stationary or deactivated. More specifically, when activated the main pump 14 creates suction at the inlet port 22. Accordingly, hydraulic fluid is drawn from the sump 18, through the sump filter 32 and the sump port 30 into the first fluid communication passage 40, through the inlet port 22 of the main pump 14, through the outlet port 24 of the main pump 14 into the second fluid communication passage 42, and to the plurality of transmission components 12. Additional hydraulic fluid flow is drawn from the sump 18, through the sump filter 32 and the sump port 30 into the third fluid communication passage 44 then into the fifth fluid communication passage 48, through the inlet port 22 of the main pump 14, through the outlet port 24 of the main pump 14 into the second fluid communication passage 42 and to the plurality of transmission components 12. There the combined hydraulic fluid flows are able to provide flow for hydraulic control functions, lubrication or cooling, as required, to the plurality of transmission components 12. Excess hydraulic fluid flow is channeled from the plurality of transmission components 12 into the bypass passage or port 50. The excess hydraulic fluid flow enters the fifth fluid communication channel 48 and is drawn up to the inlet port 22 of the main pump 14. This prevents the excess hydraulic fluid from flowing into the sump 18 and possibly damaging the sump filter 32. Additionally, air located within or near the inlet port 26 of the auxiliary pump 16 is entrained with the hydraulic fluid flow through the third fluid communication passage 44 as it flows into the fifth fluid communication passage 48 and to the main pump 14.

FIG. 1B illustrates the flow of hydraulic fluid (indicated by the plurality of arrows) through the pump system 10 when the auxiliary pump 16 is activated and the main pump 14 is stationary or deactivated. More specifically, the auxiliary pump 16 creates suction at the inlet port 26. Accordingly, hydraulic fluid is drawn from the sump 18, through the sump port 30 and sump filter 32 into the third fluid communication passage 44, through the inlet port 26 of the auxiliary pump 16, through the outlet port 28 of the auxiliary pump 16 into the fourth fluid communication passage 46 and to the plurality of transmission components 12. There the hydraulic fluid is able to provide flow for hydraulic control functions, lubrication or cooling, as required, to the plurality of transmission components 12. Excess hydraulic fluid flow is channeled from the plurality of transmission components 12 into the bypass passage 50. The excess hydraulic fluid flow enters the fifth fluid communication channel 48 and is drawn down to the inlet port 26 of the auxiliary pump 16. This prevents the excess hydraulic fluid from flowing into the sump 18 and possibly damaging the sump filter 32. Additionally, air located within or near the inlet port 22 of the main pump 14 and within the first fluid communication passage 40 is entrained with the hydraulic fluid flow through the first fluid passage 40 as it flows into the fifth fluid communication passage 48. Air located near a top portion of the fluid inlet port of the main pump 14 may be entrained with the hydraulic fluid flow through a seventh fluid communication passage 52 that communicates with the fifth fluid communication passage 48 and a top of the fluid inlet port 22 of the main pump 14.

In an embodiment, the fifth passage is angled towards the inlet port 22 of the main pump 14 near one end and the inlet port 26 of the auxiliary pump 16 near the other end. FIGS. 1A and 1B show an embodiment where the ends are angled at 45 degrees with respect to the first fluid communication passage 40 and the third fluid communication passage 44. The present invention contemplates any angle that directs fluid flow towards the pumps, including a zero degree angle where the ends of the fifth fluid passage 48 are parallel to the first fluid passage 40 and the third fluid passage 44.

The description of the invention is merely exemplary in nature and variations that do not depart from the gist of the invention are intended to be within the scope of the invention.

Such variations are not to be regarded as a departure from the spirit and scope of the invention.

The invention claimed is:

1. A system for lubricating a plurality of transmission components with a hydraulic fluid, the system comprising:
   a sump defining a reservoir for providing the hydraulic fluid;
   a first pump having a fluid inlet port and a fluid outlet port;
   a first fluid passage having a first end connected to the sump and a second end connected to the fluid inlet port of the first pump;
   a second fluid passage having a first end connected to the fluid outlet port of the first pump and a second end in fluid communication with the plurality of transmission components;
   a second pump having a fluid inlet port and a fluid outlet port;
   a third fluid passage having a first end connected to the sump and a second end connected to the fluid inlet port of the second pump;
   a fourth fluid passage having a first end connected to the outlet port of the second pump and a second end in fluid communication with the plurality of transmission components;
   a fifth fluid passage having a first end and a second end, wherein the first end of the fifth passage is directly connected with at least one of the first fluid passage and the inlet port of the first pump, and wherein the second end of the fifth fluid passage is directly connected with at least one of the third fluid passage and the inlet port of the second pump; and
   a sixth fluid passage having a first end direct in fluid communication with the plurality of transmission components and a second end directly connected to the fifth fluid passage for communicating fluid from the plurality of transmission components to the fifth fluid passage.

2. The system of claim 1, wherein the first end of the fifth fluid passage is connected to the inlet port of the first pump and the second end of the fifth fluid passage is connected to the inlet port of the second pump.

3. The system of claim 1, wherein the first end of the fifth fluid passage is connected to the first fluid passage proximate to the inlet port of the first pump, and wherein the second end of the fifth fluid passage is connected to the third fluid passage proximate to the inlet port of the second pump.

4. The system of claim 1, further comprising a seventh fluid passage with a first end and a second end, wherein the first end of the seventh fluid passage is in fluid communication with the first end of the fifth fluid passage, and wherein the second end of the seventh fluid passage is in fluid communication with a top portion of the fluid inlet port of the first pump, wherein the top portion of the fluid inlet port is referenced with respect to gravity.

5. The system of claim 1, further comprising a transmission housing, wherein the first fluid passage, the second fluid passage, the third fluid passage, the fourth fluid passage, and the fifth fluid passage are defined by the transmission housing.

6. The system of claim 1, wherein the sump further comprises a filter disposed between the sump and at least one of the first end of the first fluid passage and the first end of the third fluid passage.

7. The system of claim 1, wherein the fifth fluid passage connects to the inlet port of the first pump at a first predetermined angle with respect to the first fluid passage and to the inlet port of the second pump at a second predetermined angle with respect to the third fluid passage.

8. The system of claim 7, wherein the first predetermined angle is greater than 0 degrees and less than approximately 45 degrees, and the second predetermined angle is greater than 0 degrees and less than approximately 45 degrees.

9. The system of claim 1, wherein the first pump comprises a crescent pump.

10. The system of claim 1, wherein the second pump comprises a gerotor pump.

11. The system of claim 1 wherein the first pump and the second pump are continuously disposed in parallel between the sump and the plurality of transmission components.

12. A system for providing hydraulic fluid to a plurality of transmission components, the system comprising:
    a sump defining a reservoir for providing the hydraulic fluid;
    a first pump having a fluid inlet port and a fluid outlet port;
    a first fluid passage having a first end connected to the sump and a second end connected to the fluid inlet port of the first pump;
    a second fluid passage having a first end connected to the fluid outlet port of the first pump and a second end in fluid communication with the plurality of transmission components;
    a second pump having a fluid inlet port and a fluid outlet port;
    a third fluid passage having a first end connected to the sump and a second end connected to the fluid inlet port of the second pump;
    a fourth fluid passage having a first end connected to the outlet port of second pump and a second end in fluid communication with the plurality of transmission components;
    a fifth fluid passage having a first end and a second end, wherein the first end of the fifth fluid passage is directly connected to the first fluid passage proximate to the inlet port of the first pump, and wherein the second end of the fifth fluid passage is directly connected to the third fluid passage proximate to the inlet port of the second pump; and
    a sixth fluid passage having a first end in direct fluid communication with the plurality of transmission components and a second end directly connected to the fifth fluid passage for communicating fluid from the plurality of transmission components to the fifth fluid passage.

13. The system of claim 12, further comprising a seventh fluid passage with a first end and a second end, wherein the first end of the seventh fluid passage is in fluid communication with the first end of the fifth fluid passage, and wherein the second end of the seventh fluid communication passage is in fluid communication with a top portion of the fluid inlet port of the first pump, wherein the top portion of the fluid inlet port is referenced with respect to gravity.

14. The system of claim 12, further comprising a transmission housing, wherein the first fluid passage, the second fluid passage, the third fluid passage, the fourth fluid passage, and the fifth fluid passage are defined by the transmission housing.

15. The system of claim 12, wherein the sump further comprises a filter disposed between the sump and at least one of the first end of the first fluid passage and the first end of the third fluid passage.

16. The system of claim 12, wherein the fifth fluid passage connects to the first fluid passage at an angle from 0 degrees to approximately 45 degrees with respect to the first fluid passage and to the third fluid passage at an angle from 0 degrees to approximately 45 degrees with respect to the third fluid passage.

17. The system of claim 12 wherein the first pump and the second pump are continuously disposed in parallel between the sump and the plurality of transmission components.

18. A system for lubricating a plurality of transmission components with a hydraulic fluid, the system comprising:
- a sump defining a reservoir for providing the hydraulic fluid;
- a first pump having a fluid inlet port and a fluid outlet port, wherein the first pump is a crescent pump;
- a first fluid passage having a first end connected to the sump and a second end connected to the fluid inlet port of the first pump;
- a second fluid passage having a first end connected to the fluid outlet port of the first pump and a second end in fluid communication with the plurality of transmission components;
- a second pump having a fluid inlet port and a fluid outlet port, wherein the second pump is a gerotor pump;
- a third fluid passage having a first end connected to the sump and a second end connected to the fluid inlet port of the second pump;
- a fourth fluid passage having a first end connected to the outlet port of second pump and a second end in fluid communication with the plurality of transmission components;
- a fifth fluid passage having a first end directly connected to the inlet port of the first pump and a second end directly connected to the inlet port of the second pump; and
- a sixth fluid passage having a first end in direct fluid communication with the plurality of transmission components and a second end directly connected to the fifth fluid passage for communicating fluid from the plurality of transmission components to the fifth fluid passage.

19. The system of claim 16 wherein the first pump and the second pump are continuously disposed in parallel between the sump and the plurality of transmission components.

* * * * *